United States Patent
Xie et al.

(10) Patent No.: US 12,183,028 B2
(45) Date of Patent: Dec. 31, 2024

(54) OBJECT-BASED SHORT RANGE MEASUREMENT METHOD, DEVICE AND SYSTEM, AND STORAGE MEDIUM

(71) Applicant: Beijing Smarter Eye Technology Co. Ltd., Beijing (CN)

(72) Inventors: Qiwei Xie, Beijing (CN); Feng Cui, Beijing (CN); Haitao Zhu, Beijing (CN); Zhao Sun, Beijing (CN); Ran Meng, Beijing (CN); An Jiang, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 382 days.

(21) Appl. No.: 17/811,215

(22) Filed: Jul. 7, 2022

(65) Prior Publication Data

US 2022/0343532 A1   Oct. 27, 2022

Related U.S. Application Data

(63) Continuation-in-part of application No. 16/725,201, filed on Dec. 23, 2019, now abandoned.

(30) Foreign Application Priority Data

Dec. 4, 2019  (CN) .......................... 201911224971.3

(51) Int. Cl.
*G06T 7/70* (2017.01)
*G06V 10/25* (2022.01)
*G06V 20/62* (2022.01)

(52) U.S. Cl.
CPC ................ *G06T 7/70* (2017.01); *G06V 10/25* (2022.01); *G06V 20/625* (2022.01);
(Continued)

(58) Field of Classification Search
CPC .. G06T 7/50; G06T 7/55; G06T 7/579; G06T 7/593; G06T 7/596; G06T 2207/10028;
(Continued)

(56) References Cited

U.S. PATENT DOCUMENTS

| 2002/0134151 A1* | 9/2002 | Naruoka | G06T 7/50 |
|---|---|---|---|
| | | | 382/104 |
| 2008/0180528 A1* | 7/2008 | Saito | H04N 7/18 |
| | | | 348/148 |

(Continued)

OTHER PUBLICATIONS

Balas, Marius M., and Valentina E. Balas. "Monoscopic CCD Cameras as Distance Sensors." AIP Conference Proceedings. vol. 1117. No. 1. American Institute of Physics, 2009. (Year: 2009).*

(Continued)

*Primary Examiner* — Geoffrey E Summers
(74) *Attorney, Agent, or Firm* — NKL Law; Allen Xue (57) ABSTRACT

Provided is an Aobject-based short range measurement method, a short range measurement device, a short range measurement system, and a storage medium. The short range measurement method includes: identifying a target object, and acquiring border information about an ROI of the target object; acquiring two groups of geometric constraint points of the target object with respect to a left-eye camera and a right-eye camera respectively; acquiring pixel coordinates of each geometric constraint point and a border pixel size corresponding to the border information, and calculating a monocular distance estimation value of the target object; acquiring an overall disparity of the two groups of geometric constraint points, and calculating a binocular distance estimation value of the target object in accordance with the overall disparity; and acquiring a final measurement value in accordance with the monocular distance estimation value and the binocular distance estimation value.

12 Claims, 2 Drawing Sheets

(52) U.S. Cl.
CPC ............... *G06T 2207/10012* (2013.01); *G06T 2207/20076* (2013.01); *G06T 2207/30261* (2013.01)

(58) Field of Classification Search
CPC . G06T 2207/10012; G06T 2207/10021; G06T 2207/30236; G06T 2207/30248; G06T 2207/30252; G06T 2207/30261; G06T 2207/30264; G06T 7/70; G06T 2207/20076; G06V 20/625; G06V 10/25; G06V 10/12
See application file for complete search history.

(56) References Cited

U.S. PATENT DOCUMENTS

| | | | | |
|---|---|---|---|---|
| 2015/0234044 | A1* | 8/2015 | Ouchi | G01S 13/93 342/118 |
| 2016/0019791 | A1* | 1/2016 | Lin | G06V 20/58 382/105 |
| 2016/0320184 | A1* | 11/2016 | Long | G06T 7/50 |
| 2021/0090281 | A1* | 3/2021 | Geva | H04N 13/246 |
| 2021/0124966 | A1 | 4/2021 | Blais-Morin et al. | |
| 2021/0243421 | A1* | 8/2021 | Fendt | H04N 13/25 |
| 2021/0312653 | A1* | 10/2021 | Li | G06V 10/245 |

OTHER PUBLICATIONS

Krishna, Arjun. Stereo vision-based vehicular proximity estimation. Diss. Rutgers University—Graduate School—New Brunswick, 2014. (Year: 2014).*

Wang, Wenfeng, et al. "A rough vehicle distance measurement method using monocular vision and license plate." 2015 IEEE International Conference on Cyber Technology in Automation, Control, and Intelligent Systems (Cyber). IEEE, 2015. (Year: 2015).*

Li, Shuaijun, et al. "Vehicle 3-dimension measurement by monocular camera based on license plate." 2016 IEEE International Conference on Robotics and Biomimetics (ROBIO). IEEE, 2016. (Year: 2016).*

Karagiannis, Vasileios. Distance estimation between vehicles based on fixed dimensions licence plates. Diss. University of Patras, 2017. (Year: 2017).*

Song, Yaoye, et al. "Fast Monocular Vision Based Vehicle Distance Measurement by License Plate Localization." 2018 Chinese Automation Congress (CAC). IEEE. (Year: 2018).*

Yang, Lei, et al. "Vehicle speed measurement based on binocular stereovision system." IEEE Access 7 (2019): 106628-106641. (Year: 2019).*

Krishna, Arjun; "Stereo vision-based vehicular proximity estimation"; Diss. Rutgers University—Graduate School—New Brunswick, Oct. 2014; pp. 1-52.

Song, Yaoye et al.; "Fast Monocular Vision Based Vehicle Distance Measurement by License Plate Localization." 2018 Chinese Automation Congress (CAC). IEEE.; 2018; pp. 2774-2779.

Balas, Marius M. et al.; "Monoscopic CCD Cameras as Distance Sensors."; AIP Conference Proceedings; American Institute of Physics, vol. 1117. No. 1. Apr. 27, 2009; pp. 67-73.

Karagiannis, Vasileios; "Distance estimation between vehicles based on fixed dimensions licence plates"; Diss. University of Patras, Feb. 2017; pp. 1-89.

Li, Shuaijun et al.; "Vehicle 3-dimension measurement by monocular camera based on license plate." 2016 IEEE International Conference on Robotics and Biomimetics (ROBIO). IEEE, Dec. 3-7, 2016; pp. 800-806.

Wang, Wenfeng et al.; "A rough vehicle distance measurement method using monocular vision and license plate." 2015 IEEE International Conference on Cyber Technology in Automation, Control, and Intelligent Systems (Cyber). IEEE, Jun. 8-12, 2015; pp. 426-430.

Yang, Lei et al.; "Vehicle speed measurement based on binocular stereovision system." vol. 7; Jul. 5, 2019; pp. 106628-106641.

* cited by examiner

OBJECT-BASED SHORT RANGE MEASUREMENT METHOD, DEVICE AND SYSTEM, AND STORAGE MEDIUM

CROSS-REFERENCE TO RELATED APPLICATIONS

This application is a continuation-in-part of U.S. patent application Ser. No. 16/725,201, filed Dec. 23, 2019, which claims the benefit of priority from Chinese Patent Application No. CN 201911224971.3, filed Dec. 4, 2019, the content of each is incorporated herein by reference in its entirety.

TECHNICAL FIELD

The present disclosure relates to the field of the binocular imaging technology, in particular to an object-based short range measurement method, a short range measurement device, a short range measurement system, and a storage medium.

BACKGROUND

Along with the development of the sensor technology and the machine vision technology, binocular cameras have been widely applied to robots and intelligent vehicles. For the assistant or automatic driving technology using a visual sensor, the distance measurement on an object in front of a vehicle is a very important function. Conventional distance measurement schemes using the visual sensor mainly include a monocular vision distance measurement scheme (depending on a sample database) and a binocular vision distance measurement scheme (depending on disparity).

In the conventional monocular vision distance measurement scheme (depending on the sample database), in most of the scenarios, it is necessary to acquire a full view of an obstacle, e.g., a rear of a vehicle ahead. However, when a distance between a current vehicle and the vehicle ahead is relatively small, e.g., when the distance is smaller than 5 m, due to the limitation of a field angle and a mounting position of the visual sensor, it is impossible to acquire an image of the entire rear of the vehicle ahead. Without an image of the entire rear end, the monocular vision distance measurement scheme (depending on the sample database) may fail.

The conventional binocular vision distance measurement scheme (depending on disparity) principally depends on the calculation of disparity. The so-called disparity refers to a difference between imaging positions of a same object in a left-eye image and a right-eye image, i.e., a difference between pixel coordinates of the object in the left-eye image and pixel coordinates of the object in the right-eye image. The disparity is calculated mainly on the basis of a stereo matching principle, so the computational cost of the disparity is relatively high. This is because, the smaller the distance between the obstacle and the current vehicle, the larger a disparity value, and the larger a searching range for the matching calculation. In actual use, taking the power consumption, the efficiency and the timeliness into consideration, usually the disparity is calculated within a specified range of an image, rather than the entire range of the image. Hence, there is also a short-range "blind zone" for the binocular sensor. For example, when the distance is smaller than 3 m, it is impossible to acquire the valid disparity information so that the binocular vision distance measurement (depending on disparity) may also fail.

SUMMARY

The present disclosure provides an object-based short range measurement method, a short range measurement device, a short range measurement system, and a storage medium, so as to at least partially solve the problem in the related art where the conventional monocular or binocular vision distance measurement scheme fail in the short range measurement.

In one aspect, the present disclosure provides in some embodiments an object-based short range measurement method, including: identifying a target object, and acquiring border information about a Region of Interest (ROI) of the target object; acquiring a group of geometric constraint points of the target object with respect to each monocular camera in accordance with the border information, two groups of geometric constraint points being provided with respect to a left-eye camera and a right-eye camera respectively; acquiring pixel coordinates of each geometric constraint point and a border pixel size corresponding to the border information, and calculating a monocular distance estimation value of the target object; acquiring an overall disparity of the two groups of geometric constraint points, and calculating a binocular distance estimation value of the target object in accordance with the overall disparity; and acquiring a final measurement value in accordance with the monocular distance estimation value and the binocular distance estimation value.

In a possible embodiment of the present disclosure, the object is a license plate. The acquiring the border information about the ROI of the target object and acquiring the group of geometric constraint points of the target object with respect to each monocular camera in accordance with the border information includes: subjecting the ROI of the detected license plate to edge localization, searching a border of the license plate using an edge enhancement algorithm, and localizing the license plate, so as to acquire the border information; subjecting the acquired border information to linear fitting in the left-eye camera, and determining each intersection between two adjacent edges corresponding to the border information, so as to acquire the geometric constrain points of the license plate with respect to the left-eye camera; and subjecting the acquired border information to linear fitting in the right-eye camera, and determining each intersection between two adjacent edges corresponding to the border information, so as to acquire the geometric constrain points of the license plate with respect to the right-eye camera.

In a possible embodiment of the present disclosure, the acquiring the pixel coordinates of each geometric constraint point and the border pixel size corresponding to the border information and calculating the monocular distance estimation value of the target object includes: acquiring the pixel coordinates of each geometric constraint point, and calculating a pixel size of each edge to acquire the border pixel size corresponding to the border information, the border pixel size being set as x; and calculating the monocular distance estimation value of the target object through an equation $Z\_m = f * X/x$, where f represents a focal length, $Z\_m$ represents the monocular distance estimation value of the target object, x represents a pixel length, and X represents an actual physical length.

In a possible embodiment of the present disclosure, the acquiring the overall disparity of the two groups of geometric constraint points and calculating the binocular distance estimation value of the target object in accordance with the overall disparity includes: acquiring disparity values of a plurality of geometric constraint points in accordance with the geometric constraint points of the target object with respect to the left-eye camera and the geometric constraint points of the target object with respect to the right-eye camera; calculating an average disparity value of the disparity values, so as to acquire the overall disparity, the overall display being set as d; and calculating the binocular distance estimation value through an equation Z_b=Bf/d, where Bf represents a product of a base line of a binocular camera and the focal length, and Z_b represents the binocular distance estimation value of the target object.

In a possible embodiment of the present disclosure, the acquiring the final measurement value in accordance with the monocular distance estimation value and the binocular distance estimation value includes calculating an average value of the monocular distance estimation value and the binocular distance estimation value, so as to acquire the final measurement value.

In another aspect, the present disclosure provides in some embodiments an object-based short range measurement device, including: an identification unit configured to identify a target object, and acquire border information about an ROI of the target object; a constraint point acquisition unit configured to acquire a group of geometric constraint points of the target object with respect to each monocular camera in accordance with the border information, two groups of geometric constraint points being provided with respect to a left-eye camera and a right-eye camera respectively; a monocular distance estimation unit configured to acquire pixel coordinates of each geometric constraint point and a border pixel size corresponding to the border information, and calculate a monocular distance estimation value of the target object; a binocular distance estimation unit configured to acquire an overall disparity of the two groups of geometric constraint points, and calculate a binocular distance estimation value of the target object in accordance with the overall disparity; and a measurement value acquisition unit configured to acquire a final measurement value in accordance with the monocular distance estimation value and the binocular distance estimation value.

In a possible embodiment of the present disclosure, the object is a license plate. The constraint point acquisition unit is further configured to: subject the ROI of the detected license plate to edge localization, search a border of the license plate using an edge enhancement algorithm, and localize the license plate, so as to acquire the border information; subject the acquired border information to linear fitting in the left-eye camera, and determine each intersection between two adjacent edges corresponding to the border information, so as to acquire the geometric constrain points of the license plate with respect to the left-eye camera; and subject the acquired border information to linear fitting in the right-eye camera, and determine each intersection between two adjacent edges corresponding to the border information, so as to acquire the geometric constrain points of the license plate with respect to the right-eye camera.

In a possible embodiment of the present disclosure, the monocular distance estimation unit is further configured to: acquire the pixel coordinates of each geometric constraint point, and calculate a pixel size of each edge to acquire the border pixel size corresponding to the border information, the border pixel size being set as x; and calculate the monocular distance estimation value of the target object through an equation $Z\_m=f*X/x$, where f represents a focal length, Z_m represents the monocular distance estimation value of the target object, x represents a pixel length, and X represents an actual physical length. The binocular distance estimation unit is further configured to: acquire disparity values of a plurality of geometric constraint points in accordance with the geometric constraint points of the target object with respect to the left-eye camera and the geometric constraint points of the target object with respect to the right-eye camera; calculate an average disparity value of the disparity values, so as to acquire the overall disparity, the overall display being set as d; and calculate the binocular distance estimation value through an equation $Z\_b=Bf/d$, where Bf represents a product of a base line of a binocular camera and the focal length, and Z_b represents the binocular distance estimation value of the target object.

In yet another aspect, the present disclosure provides in some embodiments a short range measurement system including a processor and a memory. The memory is configured to store therein one or more program instructions. The processor is configured to execute the one or more program instructions so as to implement the above-mentioned short range measurement method.

In still yet another aspect, the present disclosure provides in some embodiments a computer-readable storage medium storing therein one or more program instructions. The one or more program instructions are executed by a short range measurement system so as to implement the above-mentioned short range measurement method.

According to the object-based short range measurement method, the short range measurement device, the short range measurement system and the storage medium in the embodiments of the present disclosure, the target object may be identified, and the border information about the ROI of the target object may be acquired. Next, the group of geometric constraint points of the target object may be acquired with respect to each monocular camera in accordance with the border information, and two groups of geometric constraint points may be provided with respect to a left-eye camera and a right-eye camera respectively. Next, the pixel coordinates of each geometric constraint point and a border pixel size corresponding to the border information may be acquired, and the monocular distance estimation value of the target object may be calculated. Next, the overall disparity of the two groups of geometric constraint points may be acquired, and the binocular distance estimation value of the target object may be calculated in accordance with the overall disparity. Then, the final measurement value may be acquired in accordance with the monocular distance estimation value and the binocular distance estimation value. Through extracting the border and the geometric constraint points of the object, the monocular distance estimation value may be acquired in accordance with the border pixel size and positions of the geometric constraint points with respect to each monocular camera, the overall disparity may be acquired in accordance with the geometric constraint points so as to acquire the binocular distance estimation value, and then the final measurement value may be acquired in accordance with the monocular distance estimation value and the binocular distance estimation value. In addition, the object may be a short-range object. As a result, it is able to solve the problem in the related art where the conventional monocular or binocular vision distance measurement scheme is failed during the short range measurement, thereby to perform the short range measurement.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

REFERENCE SIGN LIST

100 identification unit
200 constraint point acquisition unit
300 monocular distance estimation unit
400 binocular distance estimation unit
500 measurement value acquisition unit

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
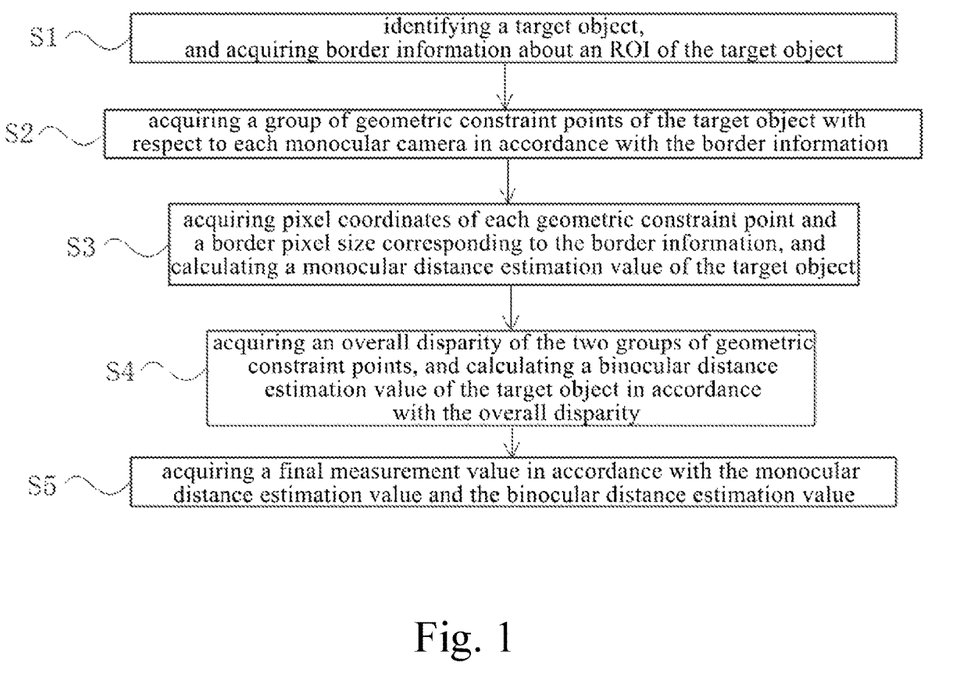
FIG. 1 is a flow chart of a short range measurement method according to one embodiment of the present disclosure.

The present disclosure provides in some embodiments an object-based short range measurement method, so as to measure a distance of a nearby object through identifying and processing a target object using a binocular camera having a left-eye camera and a right-eye camera, thereby solving the problem in the related art where the conventional monocular or binocular vision distance measurement scheme is failed during the short range measurement. As shown in FIG. 1, the short range measurement method may include the following steps.

S1: identifying a target object, and acquiring border information about an ROI of the target object. The target object may be any component of a vehicle having a fixed size, e.g., a tail lamp or a license plate. The license plate may be of a standard size, and when the license plate is selected as the target object, it is able to improve the reliability. Hence, in the embodiments of the present disclosure, the license plate may be selected as the target object. In actual use, the ROI of the license plate may be detected. When the license plate is identified, the process may proceed to the subsequent steps. When there is no identified license plate currently, it may not proceed to the subsequent steps, and instead, the target object may be identified repeatedly until the license plate has been identified.

S2: acquiring a group of geometric constraint points of the target object with respect to each monocular camera, i.e., the left-eye camera and the right-eye camera, in accordance with the border information, two groups of geometric constraint points being provided with respect to a left-eye camera and a right-eye camera, respectively. When the license plate, as the target object, has been identified, the ROI of the detected license plate may be subjected to edge localization, and a border of the license plate may be searched using an edge enhancement algorithm, so as to localize the license plate. Then, the border information acquired in S1 may be subjected to linear fitting. The license plate is of a rectangular shape, so after the linear fitting, each intersection between two adjacent edges of four edges may be determined, so as to acquire the geometric constrain points of the license plate. In a same side view, the quantity of the geometric constraint points may be four. It should be appreciated that, S2 may be performed with respect to each of a left-eye image and a right-eye image, i.e., the geometric constraint points of the same license plate may be determined with respect to each of the left-eye image and the right-eye image.

In other words, when the object is a license plate, the acquiring the border information about the ROI of the target object and acquiring the group of geometric constraint points of the target object with respect to each monocular camera in accordance with the border information may include: subjecting the ROI of the detected license plate to edge localization, searching the border of the license plate using the edge enhancement algorithm, and localizing the license plate, so as to acquire the border information; subjecting the acquired border information to linear fitting in the left-eye camera, and determining each intersection between two adjacent edges corresponding to the border information, so as to acquire the geometric constrain points of the license plate with respect to the left-eye camera; and subjecting the acquired border information to linear fitting in the right-eye camera, and determining each intersection between two adjacent edges corresponding to the border information, so as to acquire the geometric constrain points of the license plate with respect to the right-eye camera.

The edge enhancement algorithm may be one of image enhancement processing methods capable of highlighting an edge where brightness values (or tones) of adjacent pixels (or regions) in an image remarkably differ from each other (i.e., an edge where the tone of the image changes suddenly or a boundary between two feature types). After edge enhancement, the image may be able to display the boundary between different feature types or phenomena, or a trajectory of a linear image, in a clearer manner, thereby to facilitate the identification of different feature types and the determination of their distribution.

S3: acquiring pixel coordinates of each geometric constraint point and a border pixel size corresponding to the border information, and calculating a monocular distance estimation value of the target object. The monocular distance estimation value may be a left-eye distance estimation value based on the left-eye image or a right-eye distance estimation value based on the right-eye image. It should be appreciated that, when the pixel coordinates of each geometric constraint point and the border information have been acquired with respect to the left-eye camera, the monocular distance estimation value for the left-eye camera may be acquired, and when the pixel coordinates of each geometric constraint point and the border information have been acquired with respect to the right-eye camera, the monocular distance estimation value for the right-eye camera may be acquired.

To be specific, the calculating the monocular distance estimation value of the target object may include: acquiring the pixel coordinates of each geometric constraint point, and calculating a pixel size of each edge to acquire the border pixel size corresponding to the border information, the border pixel size being set as x (i.e., calculating the pixel size of each of four edges in accordance with the pixel coordinates pp of each geometric constraint point of the license plate, so as to acquire the border pixel size x); and calculating the monocular distance estimation value of the target object through an equation $Z\_m=fX/x$, where f represents a focal length of the monocular camera, $Z\_m$ represents the monocular distance estimation value of the target object, x represents a pixel length, and X represents an actual physical length of the object, e.g., the license plate. The equation $Z\_m=f*X/x$ may be acquired through transforming an equation $f/Z\_m=x/X$, so as to acquire the monocular distance estimation value of the license plate (in which f represents the focal length, $Z\_m$ represents the monocular distance estimation value, x represents the pixel length and X represents the actual physical length).

S4: acquiring an overall disparity of the two groups of geometric constraint points, and calculating a binocular distance estimation value of the target object in accordance with the overall disparity. To be specific, disparity values of a plurality of geometric constraint points may be acquired in accordance with the geometric constraint points of the target object with respect to the left-eye camera and the geometric constraint points of the target object with respect to the right-eye camera. Next, an average disparity value of the disparity values may be calculated so as to acquire the overall disparity, and the overall display may be set as d. Then, the binocular distance estimation value may be calculated through an equation $Z\_b=Bf/d$, where Bf represents a product of a base line of a binocular camera and the focal length, and $Z\_b$ represents the binocular distance estimation value of the target object. In this case, the base line of the binocular camera is the distance between the left-eye camera and the right-eye camera. The focal length of the binocular camera is the same as the left-eye camera and the right-eye camera in the binocular camera.

In one embodiment, the disparity value of each geometric constraint point may be calculated in accordance with the geometric constraint points of the same license plate in the left-eye image and the right-eye image acquired in S1, so for each license plate, the disparity value of each of the four geometric constraint points may be acquired. Then, with respect to the same license plate, an average value of the disparity values of the four geometric constraint point may be calculated, so as to acquire the overall disparity d of the license plate. Depending on a three-dimensional reconstruction principle, the binocular distance estimation value may be calculated through the equation $Z\_b=Bf/d$, where Bf represents a product of the base line of the binocular camera and the focal length, and $Z\_b$ represents the binocular distance estimation value of the target object.

S5: acquiring a final measurement value in accordance with the monocular distance estimation value and the binocular distance estimation value. To be specific, an average value of the monocular distance estimation value and the binocular distance estimation value may be calculated, so as to acquire the final measurement value. The average value of the monocular distance estimation value $Z\_m$ and the binocular distance estimation value $Z\_b$ acquired in S3 and S4 respectively may be calculated, i.e., the final measurement value Z may be equal to $(Z\_m+Z\_b)/2$, so as to reduce an error.

According to the object-based short range measurement method in the embodiments of the present disclosure, the target object may be identified, and the border information about the ROI of the target object may be acquired. Next, the group of geometric constraint points of the target object may be acquired with respect to each monocular camera in accordance with the border information, and two groups of geometric constraint points may be provided with respect to a left-eye camera and a right-eye camera respectively. Next, the pixel coordinates of each geometric constraint point and a border pixel size corresponding to the border information may be acquired, and the monocular distance estimation value of the target object may be calculated. Next, the overall disparity of the two groups of geometric constraint points may be acquired, and the binocular distance estimation value of the target object may be calculated in accordance with the overall disparity. Then, the final measurement value may be acquired in accordance with the monocular distance estimation value and the binocular distance estimation value. Through extracting the border and the geometric constraint points of the object, the monocular distance estimation value may be acquired in accordance with the border pixel size and positions of the geometric constraint points with respect to each monocular camera, the overall disparity may be acquired in accordance with the geometric constraint points so as to acquire the binocular distance estimation value, and then the final measurement value may be acquired in accordance with the monocular distance estimation value and the binocular distance estimation value. In addition, the object may be a short-range object. As a result, it is able to solve the problem in the related art where the conventional monocular or binocular vision distance measurement scheme is failed during the short range measurement, thereby to perform the short range measurement.

Figure 2:
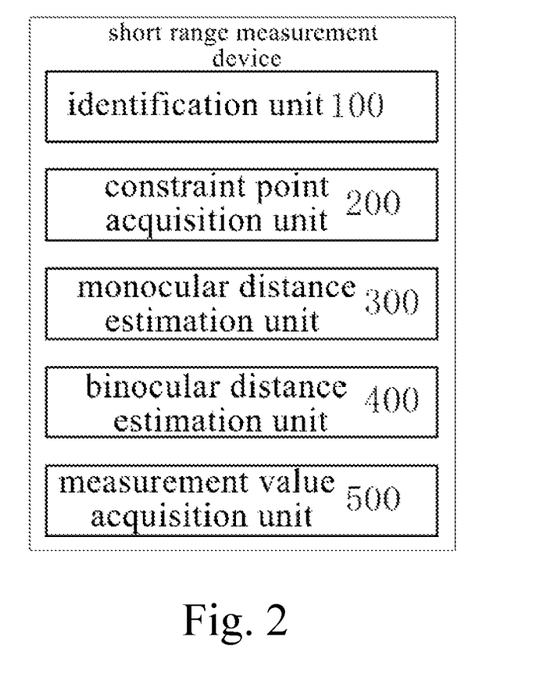
FIG. 2 is a block diagram of a short range measurement device according to another embodiment of the present disclosure.

The present disclosure further provides in some embodiments an object-based short range measurement device as hardware for implementing the above-mentioned short range measurement method. As shown in FIG. 2, the short range measurement device may include an identification unit 100, a constraint point acquisition unit 200, a monocular distance estimation unit 300, a binocular distance estimation unit 400, and a measurement value acquisition unit 500.

The identification unit 100 is configured to identify a target object, and acquire border information about an ROI of the target object. The target object may be any component of a vehicle having a fixed size, e.g., a tail lamp or a license plate. There is a national standard on a size of the license plate, and when the license plate is selected as the target object, it is able to improve the reliability. Hence, in the embodiments of the present disclosure, the license plate may be selected as the target object. In actual use, the ROI of the license plate may be detected. When there is the identified license plate, it may proceed to the subsequent steps. When there is no identified license plate currently, it may not proceed to the subsequent steps, and instead, the target object may be identified repeatedly until the license plate has been identified.

The constraint point acquisition unit 200 is configured to acquire a group of geometric constraint points of the target object with respect to each monocular camera in accordance with the border information, and two groups of geometric constraint points may be provided with respect to a left-eye camera and a right-eye camera respectively. When the license plate, as the target object, has been identified, the ROI of the detected license plate may be subjected to edge localization, and a border of the license plate may be searched using an edge enhancement algorithm, so as to localize the license plate. Then, the border information acquired in S1 may be subjected to linear fitting. The license plate is of a rectangular shape, so after the linear fitting, each intersection between two adjacent edges of four edges may be determined, so as to acquire the geometric constrain points of the license plate. In a same side view, the quantity of the geometric constraint points may be four. It should be appreciated that, S2 may be performed with respect to each of a left-eye image and a right-eye image, i.e., the geometric constraint points of the same license plate may be determined with respect to each of the left-eye image and the right-eye image.

When the object is a license plate, the constraint point acquisition unit is further configured to: subject the ROI of the detected license plate to edge localization, search the border of the license plate using the edge enhancement algorithm, and localize the license plate, so as to acquire the border information; subject the acquired border information to linear fitting in the left-eye camera, and determine each intersection between two adjacent edges corresponding to the border information, so as to acquire the geometric constrain points of the license plate with respect to the left-eye camera; and subject the acquired border information to linear fitting in the right-eye camera, and determine each intersection between two adjacent edges corresponding to the border information, so as to acquire the geometric constrain points of the license plate with respect to the right-eye camera.

The monocular distance estimation unit 300 is configured to acquire pixel coordinates of each geometric constraint point and a border pixel size corresponding to the border information, and calculate a monocular distance estimation value of the target. The monocular distance estimation value may be a left-eye distance estimation value or a right-eye distance estimation value. It should be appreciated that, when the pixel coordinates of each geometric constraint point and the border information have been acquired with respect to the left-eye camera, the monocular distance estimation value for the left-eye camera may be acquired, and when the pixel coordinates of each geometric constraint point and the border information have been acquired with respect to the right-eye camera, the monocular distance estimation value for the right-eye camera may be acquired.

The monocular distance estimation unit is further configured to: acquire the pixel coordinates of each geometric constraint point, and calculate a pixel size of each edge to acquire the border pixel size corresponding to the border information, the border pixel size being set as x; and calculate the monocular distance estimation value of the target object through an equation $Z\_m=f*X/x$, where f represents a focal length, $Z\_m$ represents the monocular distance estimation value of the target object, x represents a pixel length, and X represents an actual physical length.

The binocular distance estimation unit 400 is configured to acquire an overall disparity of the two groups of geometric constraint points, and calculate a binocular distance estimation value of the target object in accordance with the overall disparity.

The binocular distance estimation unit is further configured to: acquire disparity values of a plurality of geometric constraint points in accordance with the geometric constraint points of the target object with respect to the left-eye camera and the geometric constraint points of the target object with respect to the right-eye camera; calculate an average disparity value of the disparity values, so as to acquire the overall disparity, the overall display being set as d; and calculate the binocular distance estimation value through an equation $Z\_b=Bf/d$, where Bf represents a product of a base line of a binocular camera and the focal length, and $Z\_b$ represents the binocular distance estimation value of the target object.

The measurement value acquisition unit 500 is configured to acquire a final measurement value in accordance with the monocular distance estimation value and the binocular distance estimation value.

According to the object-based short range measurement device in the embodiments of the present disclosure, the target object may be identified, and the border information about the ROI of the target object may be acquired. Next, the group of geometric constraint points of the target object may be acquired with respect to each monocular camera in accordance with the border information, and two groups of geometric constraint points may be provided with respect to a left-eye camera and a right-eye camera respectively. Next, the pixel coordinates of each geometric constraint point and a border pixel size corresponding to the border information may be acquired, and the monocular distance estimation value of the target object may be calculated. Next, the overall disparity of the two groups of geometric constraint points may be acquired, and the binocular distance estimation value of the target object may be calculated in accordance with the overall disparity. Then, the final measurement value may be acquired in accordance with the monocular distance estimation value and the binocular distance estimation value. Through extracting the border and the geometric constraint points of the object, the monocular distance estimation value may be acquired in accordance with the border pixel size and positions of the geometric constraint points with respect to each monocular camera, the overall disparity may be acquired in accordance with the geometric constraint points so as to acquire the binocular distance estimation value, and then the final measurement value may be acquired in accordance with the monocular distance estimation value and the binocular distance estimation value. In addition, the object may be a short-range object. As a result, it is able to solve the problem in the related art where the conventional monocular or binocular vision distance measurement scheme is failed during the short range measurement, thereby to perform the short range measurement.

Figure 3:
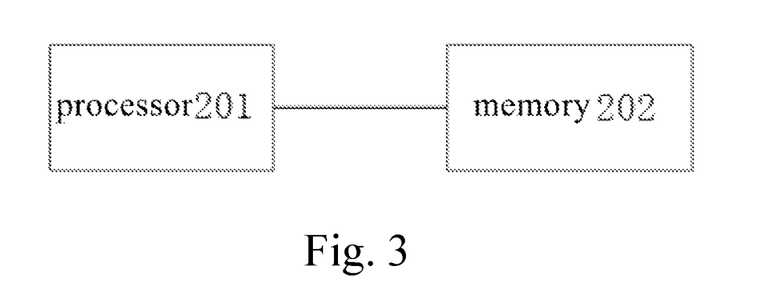
FIG. 3 is a block diagram of a short range measurement system according to still another embodiment of the present disclosure.

The present disclosure further provides in some embodiments a short range measurement system which, as shown in FIG. 3, includes a processor 201 and a memory 202. The memory is configured to store therein one or more program instructions. The processor is configured to execute the one or more program instructions so as to implement the above-mentioned short range measurement method.

Correspondingly, the present disclosure further provides in some embodiments a computer-readable storage medium storing therein one or more program instructions. The one or more program instructions may be executed by a short range measurement system so as to implement the above-mentioned short range measurement method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An object-based short range measurement method, comprising:

capturing, using a binocular camera having a left-eye camera and a right-eye camera, a left-eye image and a right-eye image of a target object, wherein the left-eye camera and the right-eye camera are placed apart from each other at a predetermined distance that is a baseline of the binocular camera;

identifying the target object in the left-eye image and the right-eye image, and acquiring border information about a Region of Interest (ROI) of the target object;

acquiring a group of geometric constraint points of the target object with respect to each of the left-eye camera and the right-eye camera in accordance with the border information;

providing a first group of geometric constraint points with respect to the left-eye camera and a second group of geometric constraint points with respect to the right-eye camera;

acquiring pixel coordinates of each geometric constraint point and a border pixel size corresponding to the border information, and calculating a monocular distance estimation value of the target object;

acquiring an overall disparity by acquiring disparity values of the first group of geometric constraint points and disparity values of the second group of geometric constraint points;

calculating an average disparity value to obtain the overall disparity d;

calculating a binocular distance estimation value of the target object in accordance with an equation $Z\_b=Bf/d$, wherein Bf represents a product of the baseline of the binocular camera and a focal length of a binocular camera, and $Z\_b$ represents the binocular distance estimation value from the target object; and calculating an average value of the monocular distance estimation value and the binocular distance estimation value to obtain a final measurement value in accordance with the monocular distance estimation value and the binocular distance estimation value.

2. The short range measurement method according to claim 1, wherein the object is a license plate, wherein the acquiring the border information about the ROI of the target object and acquiring the group of geometric constraint points of the target object with respect to each of the two monocular cameras in accordance with the border information comprises:

subjecting the ROI of the detected license plate to edge localization, searching a border of the license plate using an edge enhancement algorithm, and localizing the license plate, so as to acquire the border information;

subjecting the acquired border information to linear fitting in the left-eye camera, and determining each intersection between two adjacent edges corresponding to the border information, so as to acquire the geometric constraint points of the license plate with respect to the left-eye camera; and subjecting the acquired border information to linear fitting in the right-eye camera, and determining each intersection between two adjacent edges corresponding to the border information, so as to acquire the geometric constraint points of the license plate with respect to the right-eye camera.

3. The short range measurement method according to claim 2, wherein the acquiring the pixel coordinates of each geometric constraint point and the border pixel size corresponding to the border information and calculating the monocular distance estimation value of the target object comprises:

acquiring the pixel coordinates of each geometric constraint point, and calculating a pixel size of each edge to acquire the border pixel size corresponding to the border information, the border pixel size being set as x; and calculating the monocular distance estimation value of the target object through an equation $Z\_m=f*X/x$, where f is a focal length of the left-eye camera and the right-eye camber, $Z\_m$ represents the monocular distance estimation value of the target object, x represents a pixel size, and X represents an actual physical length of the target object.

4. A short range measurement system, comprising a processor and a memory, wherein the memory is configured to store therein one or more program instructions, and the processor is configured to execute the one or more program instructions so as to implement the short range measurement method according to claim 3.

5. A non-transitory computer-readable storage medium, storing therein one or more program instructions, wherein the one or more program instructions is executed by a short range measurement system so as to implement the short range measurement method according to claim 3.

6. A short range measurement system, comprising a processor and a memory, wherein the memory is configured to store therein one or more program instructions, and the processor is configured to execute the one or more program instructions so as to implement the short range measurement method according to claim 2.

7. A non-transitory computer-readable storage medium, storing therein one or more program instructions, wherein the one or more program instructions is executed by a short range measurement system so as to implement the short range measurement method according to claim 2.

8. A short range measurement system, comprising a processor and a memory, wherein the memory is configured to store therein one or more program instructions, and the processor is configured to execute the one or more program instructions so as to implement the short range measurement method according to claim 1.

9. A non-transitory computer-readable storage medium, storing therein one or more program instructions, wherein the one or more program instructions is executed by a short range measurement system so as to implement the short range measurement method according to claim 1.

10. An object-based short range measurement device, comprising:
   a capture unit configured to capture one or more still images or videos of a target object by using a binocular camera having a left-eye camera and a right-eye camera, wherein the two monocular cameras are placed apart from each other in a predetermined distance that is a base line of the binocular camera,
   an identification unit configured to identify the target object from the one or more still images or videos, and acquire border information about an ROI of the target object;
   a constraint point acquisition unit configured to acquire a group of geometric constraint points of the target object with respect to each of the two monocular cameras in accordance with the border information;
   a geometric constraint point provision unit configured to provide a first group of geometric constraint points with respect to the left-eye camera and a second group of geometric constraint points with respect to the right-eye camera;
   a monocular distance estimation unit configured to acquire pixel coordinates of each geometric constraint point and a border pixel size corresponding to the border information, and calculate a monocular distance estimation value of the target object;
   a binocular distance estimation unit configured to acquire an overall disparity by acquiring disparity values of the first group of geometric constraint points and disparity values of the second group of geometric constraint points, calculating an average disparity value to obtain the overall disparity d, and to calculate a binocular distance estimation value of the target object in accordance with the overall disparity d, wherein acquiring the overall disparity of the two groups of geometric constraint points and calculating the binocular distance estimation value of the target object in accordance with the overall disparity d comprises acquiring disparity values of a plurality of geometric constraint points in accordance with the first group of geometric constraint points of the target object to the left-eye camera and the second group of geometric constraint points of the target object to the right-eye camera, calculating an average disparity value of the disparity values, so as to acquire the overall disparity d, and calculating the binocular distance estimation value through an equation $Z\_b=Bf/d$, where Bf represents a product of the base line of the binocular camera and the focal length of the binocular camera, and $Z\_b$ represents the binocular distance estimation value of the target object; and
   a measurement value acquisition unit configured to calculate an average value of the monocular distance estimation value and the binocular distance estimation value to obtain a final measurement value in accordance with the monocular distance estimation value and the binocular distance estimation value.

11. The short range measurement device according to claim 10, wherein the object is a license plate,
   wherein the constraint point acquisition unit is further configured to:
   subject the ROI of the detected license plate to edge localization, search a border of the license plate using an edge enhancement algorithm, and localize the license plate, so as to acquire the border information;
   subject the acquired border information to linear fitting in the left-eye camera, and determine each intersection between two adjacent edges corresponding to the border information, so as to acquire the geometric constraint points of the license plate with respect to the left-eye camera; and
   subject the acquired border information to linear fitting in the right-eye camera, and determine each intersection between two adjacent edges corresponding to the border information, so as to acquire the geometric constraint points of the license plate with respect to the right-eye camera.

12. The short range measurement device according to claim 11, wherein the monocular distance estimation unit is further configured to:
   acquire the pixel coordinates of each geometric constraint point, and calculate a pixel size of each edge to acquire the border pixel size corresponding to the border information, the border pixel size being set as x; and
   calculate the monocular distance estimation value of the target object through an equation $Z\_m=f*X/x$, where f represents a focal length, $Z\_m$ represents the monocular distance estimation value of the target object, x represents a pixel length, and X represents an actual physical length of the target object.

* * * * *